(12) United States Patent
Firebaugh

(10) Patent No.: US 6,409,510 B1
(45) Date of Patent: Jun. 25, 2002

(54) METHOD FOR LEARNING A FOREIGN LANGUAGE

(76) Inventor: William H. Firebaugh, 2213-A Via Mariposa E., Laguna Hills, CA (US) 92653

( * ) Notice: Subject to any disclaimer, the term of this patent is extended or adjusted under 35 U.S.C. 154(b) by 0 days.

(21) Appl. No.: 09/808,478

(22) Filed: Mar. 13, 2001

(51) Int. Cl.⁷ .......................... G09B 19/06; G09B 19/08
(52) U.S. Cl. ..................................... 434/157
(58) Field of Search ................................ 434/156, 157, 434/167, 169

(56) References Cited

U.S. PATENT DOCUMENTS

| | | | |
|---|---|---|---|
| 4,112,595 A | * | 9/1978 | Fernandez et al. |
| 4,143,473 A | | 3/1979 | Mitsuya |
| 4,615,680 A | | 10/1986 | Tomatis |
| 5,492,473 A | | 2/1996 | Shea |
| 5,649,826 A | | 7/1997 | West et al. |
| 5,735,693 A | | 4/1998 | Groiss |
| 5,803,742 A | | 9/1998 | Buti |
| 5,865,625 A | | 2/1999 | Baskerville |
| 5,893,720 A | | 4/1999 | Cohen |

* cited by examiner

*Primary Examiner*—John Edmund Rovnak
(74) *Attorney, Agent, or Firm*—Eric Karich

(57) ABSTRACT

A method for learning a foreign language has a basic language kit including a sheet imprinted with a select list of key words in the foreign language, a workbook including a definition of each of the key words, and a recording of a correct pronunciation of each of the key words. Once the user has memorized the definition and the pronunciation of each of the key words, the sheet is used to facilitate a conversation between the user and a person fluent in the foreign language. Although the conversation is rudimentary at first, the user gains a working knowledge of the foreign language and learns proper sentence structure, grammar, and conjugation through repeated conversations.

7 Claims, 2 Drawing Sheets

METHOD FOR LEARNING A FOREIGN LANGUAGE

CROSS-REFERENCE TO RELATED APPLICATIONS

Not Applicable

STATEMENT REGARDING FEDERALLY SPONSORED RESEARCH

Not Applicable

BACKGROUND OF THE INVENTION

1. Field of the Invention

This invention relates generally to methods for learning a foreign language, and more particularly to a method for using sheet imprinted with a select list of key words in the foreign language to carry out a basic conversation with a person who speaks the foreign language and thereby learning the foreign language.

2. Description of Related Art

The following art defines the present state of this field:

Groiss, U.S. Pat. No. 5,735,693, teaches a method for learning a foreign language by first memorizing conjugations of representative verbs. The invention includes a device for implementing the method, the device facilitating the memorization process by using the human hearing, viewing and feeling senses.

Lien et al., U.S. Pat. No. 4,245,405, teaches a machine for teaching students to read. The machine displays the roots of a word and teaches the student to identify particular vowels and consonants, long and short vowel sounds, and soft and hard consonant sounds. The machine also determines the number of syllables in a word, identifies misspelled words, supplies missing letters, and identifies the grammatical parts of speech of the word.

Cohen, U.S. Pat. No. 5,893,720, teaches a computer toy for infants that promotes normal speech development by facilitating the infant's experimentation with babbles and other elementary sounds. The machine helps the child learn correct pronunciation by recording the infant's vocalizations and playing them back to the child.

Baskerville, U.S. Pat. No. 5,865,625, teaches an electronic flash card apparatus that is used to help students memorize words in a foreign language. The apparatus first flashes a word in a foreign language, then it flashes the correct translation in English.

Buti, U.S. Pat. No. 5,803,742, teaches a language frame including a game board that utilizes blocks having printed words in a foreign language and pictorial representations printed upon their faces.

West et al., U.S. Pat. No. 5,649,826, teaches a method and device for teaching a given language to one or more users in an entertaining manner utilizing a media series for teaching a given language to one or more users, particularly young children.

Shea, U.S. Pat. No. 5,492,473, teaches a language instruction and fact recognition apparatus and method for teaching as well as self instruction of a language, primary or secondary, increasing vocabulary of a language and providing a fact recognition basis with self learning and self checking techniques.

Mitsuya, U.S. Pat. No. 4,143,473, teaches a memorization aid device convenient to memorize foreign words. The device has an endless tape passing around two rolls and intermittently rotated by pressing a push-button. The tape bears information to be memorized, the information being visible through a pair of windows formed in a casing of the device.

Tomatis, U.S. Pat. No. 4,615,680, teaches an apparatus for assisting the practice of the mother tongue or a foreign language, with a view to total assimilation thereof The apparatus uses a standard signal generator to compare a recording of a correct pronunciation of a word and a user's pronunciation of the word. If the two signals are not within a certain tolerance of each other, the user must continue to repeat the word until the correct pronunciation is achieved.

The prior art teaches various devices to facilitate memorization of a vocabulary in a foreign language; and the prior art also teaches many methods for learning correct conjugations, sentence structure, and grammar. However, the prior art does not teach a far simpler method of ignoring correct conjugations, sentence structure, and grammar, and moving immediately into a rudimentary form of communication that allows the user to learn through use of the language. The prior art also does not teach the use of a sheet imprinted with a select list of key words in the foreign language, the sheet being useful for facilitating the rudimentary conversation between the user and a person fluent in the foreign language. The present invention fulfills these needs and provides further related advantages as described in the following summary.

SUMMARY OF THE INVENTION

The present invention teaches certain benefits in construction and use which give rise to the objectives described below.

The present invention provides a method for learning a foreign language through conversations with a person fluent in the foreign language, the conversations being facilitated with a basic language kit. The basic language kit includes a sheet imprinted with a select list of key words in the foreign language, a workbook including a definition of each of the key words, and a recording of a correct pronunciation of each of the key words. Once the user has memorized the definition and the pronunciation of each of the key words, the sheet is used to facilitate a conversation between the user and a person fluent in the foreign language. Although the conversation is rudimentary at first, the user gains a working knowledge of the foreign language and learns proper sentence structure, grammar, and conjugation through repeated conversations.

A primary objective of the present invention is to provide a method for learning a foreign language having advantages not taught by the prior art.

Another objective is to provide a sheet imprinted with a select list of key words in the foreign language, the sheet being useful for facilitating a form of "caveman speak" between a user and a person fluent in the foreign language.

A further objective is to provide a recording of a correct pronunciation of each of the key words, thereby enabling a user with limited experience to begin conversing with the person fluent in the foreign language.

Other features and advantages of the present invention will become apparent from the following more detailed description, taken in conjunction with the accompanying drawings, which illustrate, by way of example, the principles of the invention.

BRIEF DESCRIPTION OF THE DRAWING

The accompanying drawings illustrate the present invention. In such drawings.

DETAILED DESCRIPTION OF THE INVENTION

Figure 1:
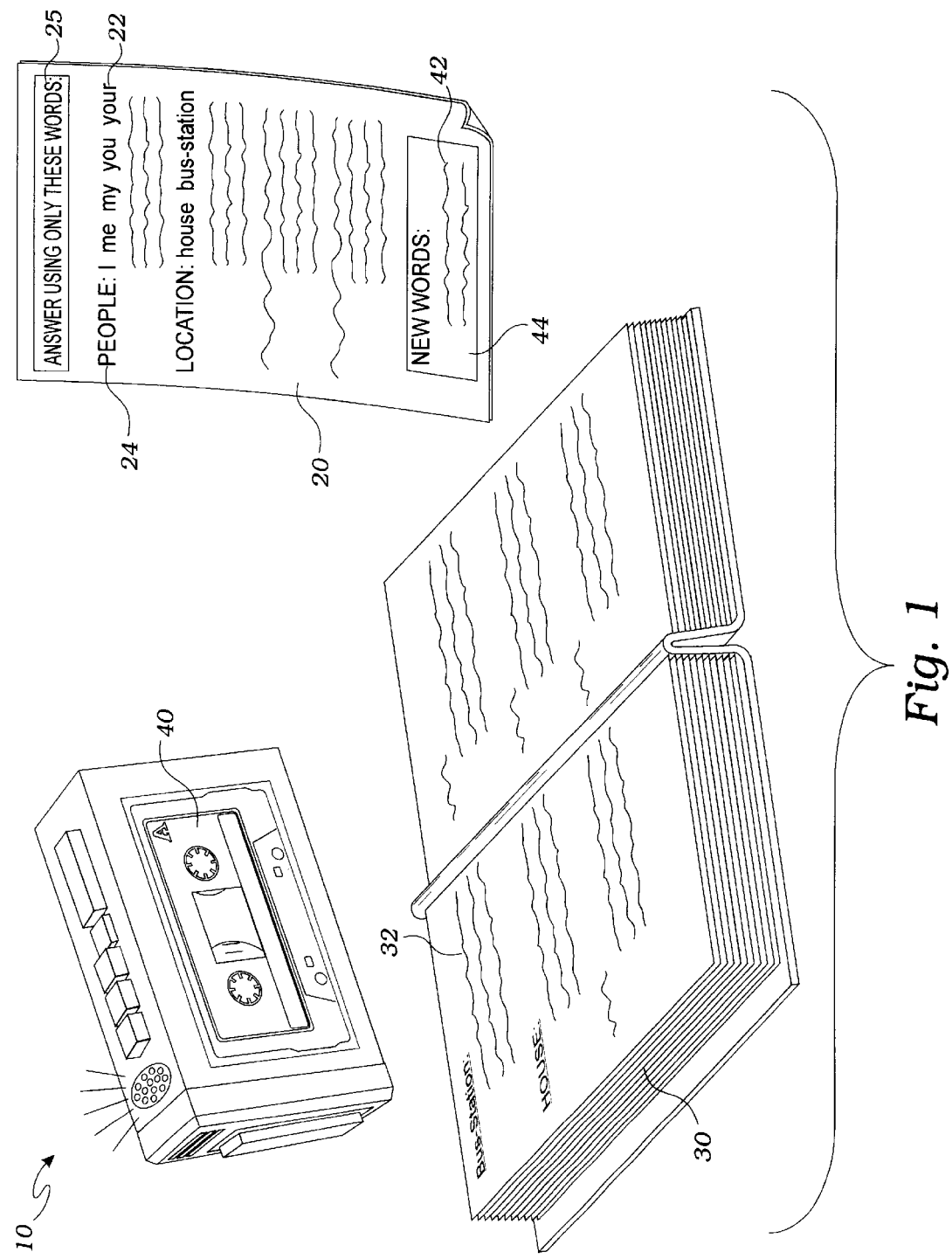
FIG. 1 is a perspective view of a basic language kit used in the preferred embodiment of the present invention, the basic language kit including a sheet imprinted with a select list of key words in the foreign language, a workbook including a definition of each of the key words, and a recording of a correct pronunciation of each of the key words.
Figure 2:
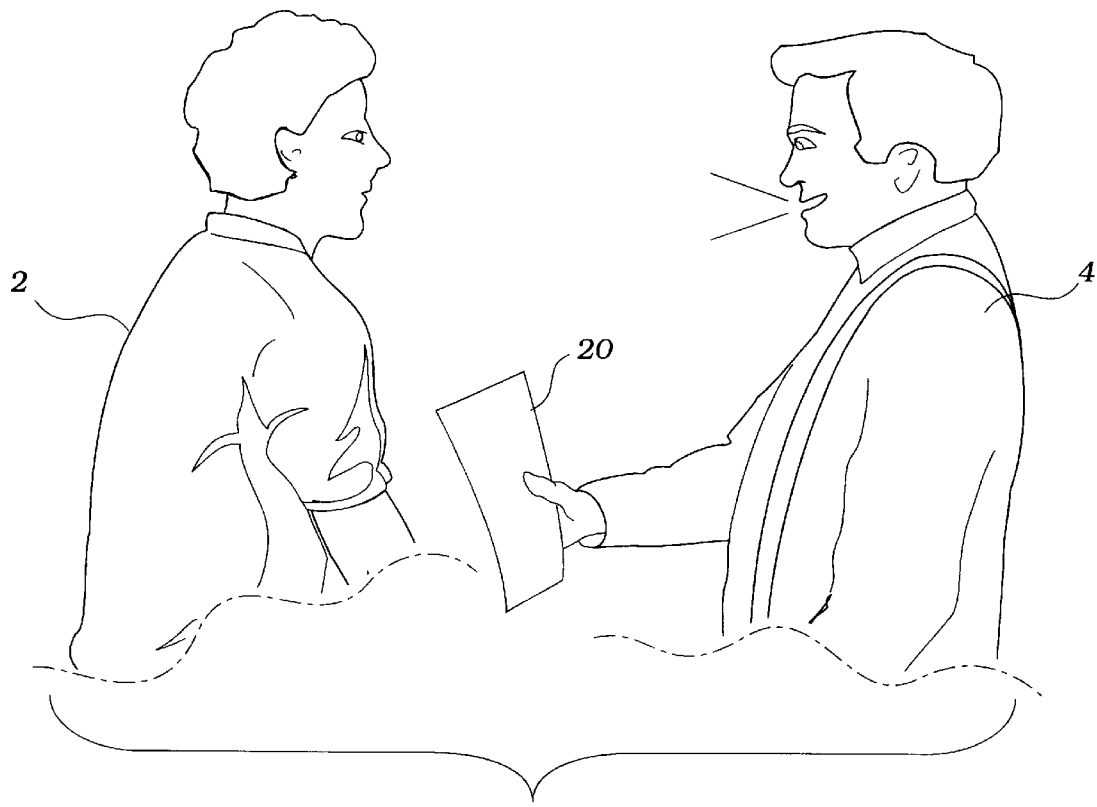
FIG. 2 is perspective view illustrating the use of the sheet to facilitate a conversation between a user and a person fluent in the foreign language.

The above described drawing figures illustrate the invention, a method for learning a foreign language using a basic language kit 10. As shown in FIG. 1, the basic language kit 10 includes a sheet 20 imprinted with a select list of key words 22 in the foreign language, a workbook 30 including a definition 32 of each of the key words 22, and a recording 40 of a correct pronunciation of each of the key words 22. Once a user 2 has memorized the key words 22, as described below, the sheet 20 is used to facilitate a conversation between the user 2 and a person 4 fluent in the foreign language, as shown in FIG. 2. Although the conversation is rudimentary at first, the user 2 gains a working knowledge of the foreign language and learns proper sentence structure, grammar, and conjugation through repeated conversations.

As shown in FIGS. 1 and 2, the sheet 20 is a flexible paper, plastic, or similar material that can readily be printed and transferred between the user 2 and the person 4. The sheet 20 is preferably no larger than 8.5 inches by 11 inches and is preferably paper that has been laminated for strength and durability. In an alternative embodiment, the sheet 20 includes a plurality of smaller cards that are laminated into a single sheet or small booklet (not shown), each of the smaller cards containing one of a plurality of categories 24, described below.

The sheet 20 preferably includes an instruction 25 prominently positioned, such as at the top of Rio the sheet 20, that instructs the person 4 to use only the key words 22 listed on the sheet 20. The sheet 20 preferably also includes a blank space 44 that enables the user 2 to add new key words 42, as described below. The list preferably includes fewer than 400 of the key words 22, and most preferably includes between 150–360 of the key words 22. The key words 22 are printed in a font that is large enough for the person 4 to readily be able to scan the key words 22 to find the key words 22 useful during the conversation. The list of key words 22 includes some key phrases, and in the preferred embodiment the key phrases are depicted to clearly show that the words of the phrase are used together, either by removing the spacing ("nicetomeetyou") or by using a hyphen to link the words ("I'm-sorry").

The key words 22 are preferably organized into a plurality of categories 24, such as the following: people, question, thing, location, position, transport, weather, describe, action, direction, quantity, time, logic, pleasure, polite, sensory, compare, and color. An example of the key words 22 includes the following: PEOPLE: I, me, my, you, your, we, they, person, an, woman, boy, girl, children, mother, father, friend, doctor, teacher, policeman; QUESTION: what, where, how, when, who, how-much, what-kind; THING: plant, animal, bread, building, drink, example, clothes, job, fire, food, bag, box, gift, language, market, money, name, smile, sound, street, circumstance, thing, water, word; LOCATION: house, bus-station, train-station, airport, restaurant, school, restroom, market, et cetera. Obviously the key words 22 selected will vary somewhat, but those skilled in the art can select the words that can be used in many common situations.

As shown in FIG. 2, the basic language kit 10 preferably includes a workbook 30 for providing the definition 32 of each of the key words 22. The workbook 30 is similar to a dictionary, providing each of the key words 22 organized alphabetically and/or by the plurality of categories 24, each of the key words 22 being associated with a pronunciation of the key word 22, a definition 32 of the key word 22, and other useful information about the key word 22, such as the etymology of the key word 22.

As shown in FIG. 2, the basic language kit 10 preferably further includes a recording 40 of a correct pronunciation of each of the key words 22. The recording 40 of the correct pronunciation of each of the key words 22 is provided on a magnetic storage media such as a magnetic audio tape, an optical storage media such as a compact disk ("CD"), stored in digital form on a computer device (not shown), or other media well known in the art. The recording 40 preferably further includes a vocalization of the definition 32 of each of the key words 22 in the foreign language, thereby facilitating the memorization of both the pronunciation and the definition 32 of each of the key words 22.

Obviously, the basic language kit 10 does not require both the workbook 30 and the recording 40, since they both facilitate the memorization of the definition 32 of each of the key words 22, as well as the correct pronunciation of each of the key words 22. Either of these tools, or another equivalent tool, can be used to enable the user 2 to memorize each of the key words 22. However, it is preferred that the basic language kit 10 include both the workbook 30 and the recording 40 because each of these tools serves a useful purpose.

Once the user 2 has memorized the definition 32 of each of the key words 22, as well as the correct pronunciation of each of the key words 22, the user 2 then attempts to converse with the person 4 fluent in the foreign language. Since the user 2 has only learned a small fraction of the words of the foreign language, and the user 2 has not learned any rules of grammar, conjugation, or other rules of the foreign language, it is important that the conversation be guided so that at least a rudimentary conversation can occur. The guidance is provided by the sheet 20.

When the user 2 starts the conversation, the user 2 first provides the person 4 with the sheet 20 and instructs the person to use only the key words 22 in the conversation. The user 2 can point to the instruction 25 to emphasize the importance that the person 4 use only the limited vocabulary known by the user 2. The user 2 is then able to converse with the person 4 in the foreign language based on the mutual understanding of the definition 32 of and correct pronunciation of the key words 22. The conversation can occur without regard for sentence structure, grammar, or conjugation, because the conversation is restricted only to the key words 22. The key words 22 can be used to describe time, place, and other elements of the conversation without regard to correct conjugation, in a form of "caveman speak" that is useful for basic human interaction. It is anticipated that the user 2 will learn the sentence structure, the grammar, and the rules of conjugation through repeated conversations.

It is also expected that the user 2 will increase his or her vocabulary through the repeated conversations, learning new key words 42. When the user 2 memorizes the definition 32 of and pronunciation of the new key word 42 during the course of conversing with the person 4, the user 2 makes a note of the new key word 42. The sheet 20 preferably includes a blank space 44 specifically for the purpose of writing down the new key word 42. When the user 2 writes the new key word 42 on the blank space 44, the new key word 42 is not only recorded for future reference by the user 2, it is also made available on the sheet 20 so that the person 4 is aware that the user 2 knows the new key word 42. Over time, the list of key words 22 will grow to encompass a larger scope of the language, until the user 2 is able to converse in more complete form without reference to the sheet 20. The user 2 will also pick up rules of grammar, sentence structure, conjugation, and other advanced elements of the foreign language, until the user 2 is fluent in the foreign language.

An example of such a conversation is expected to proceed as follows:

"Hello Sir. My name Dzugishvili. I come America 10 days before."

PERSON: "Yes, Mr. Dzugishvili, how may I be of assistance to you?"

USER: "Please Sir, talk words I know. (Hands person the list). My country Tajikistan. I try learn English, but not easy. I look job, make big money."

PERSON: "Yes, that is good. What kind of employment are you looking for?"

USER: "Please Sir, talk words I know."

PERSON: "Sorry, I forgot. This is new to me. OK. In Tajikistan what do?"

USER: "In Tajikistan policeman. Maybe in America policeman good money make?"

PERSON: "If policeman job want, then you haveto go policestation."

USER: "Thankyouverymuch. Where policestation?"

In this fashion, the user 2 is able to interact with people using the foreign language and gradually learn the foreign language through experience.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. A method for learning a foreign language, the method comprising the steps of:

a) providing a sheet imprinted with a select list of key words in the foreign language;

b) providing a definition of each of the key words;

c) providing a recording of a correct pronunciation of each of the key words;

d) memorizing the definition of each of the key words, as well as the correct pronunciation of each of the key words;

e) attempting to converse with a person fluent in the foreign language by:
   providing the person with the sheet;
   instructing the person to use only the key words in the conversation, and
   without regard for sentence structure, grammar, or conjugation, conversing with the person in the foreign language based on the mutual understanding of the definition of and correct pronunciation of the key words; and f) learning sentence structure, grammar, and conjugation through repeated conversations.

2. The method of claim 1 wherein the sheet is no larger than 8.5 inches by 11 inches.

3. The method of claim 2 wherein the sheet is laminated.

4. The method of claim 1 wherein the sheet includes a blank space, the method further comprising the steps of:

g) memorizing the definition of and pronunciation of a new key word during the course of conversing with the person;

h) writing the new key word on the blank space, thereby increasing the scope of the select list.

5. The method of claim 1 wherein the recording of the correct pronunciation of each of the key words is provided on either a magnetic or optical storage media, and further includes a recording of the definition of each of the key words in a second language, and wherein memorizing the definition of each of the key words, as well as the correct pronunciation of each of the key words is accomplished by listening to a machine output of the magnetic or optical storage media.

6. The method of claim 1 wherein the list includes fewer than 400 of the key words.

7. The method of claim 1 wherein the list includes 150–360 of the key words.

* * * * *